United States Patent
Howard et al.

(10) Patent No.: US 7,197,769 B2
(45) Date of Patent: *Mar. 27, 2007

(54) METHODS AND SYSTEMS FOR SCREENING INPUT STRINGS INTENDED FOR USE BY WEB SERVERS

(75) Inventors: Michael Howard, Bellevue, WA (US); Vikas Malhotra, Brampton (CA)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/275,920

(22) Filed: Feb. 3, 2006

(65) Prior Publication Data

US 2006/0117006 A1    Jun. 1, 2006

Related U.S. Application Data

(63) Continuation of application No. 09/437,584, filed on Nov. 9, 1999, now Pat. No. 7,051,368.

(51) Int. Cl.
*G06F 12/14* (2006.01)
*G06F 12/00* (2006.01)

(52) U.S. Cl. ............................. 726/23; 717/143; 726/11

(58) Field of Classification Search ............ 726/11–13, 726/22–24
See application file for complete search history.

(56) References Cited

U.S. PATENT DOCUMENTS

| | | | |
|---|---|---|---|
| 6,421,781 B1 | 7/2002 | Fox et al. | |
| 6,442,696 B1 | 8/2002 | Wray et al. | |
| 6,678,733 B1 | 1/2004 | Brown et al. | |
| 7,051,368 B1 * | 5/2006 | Howard et al. | ............... 726/23 |

OTHER PUBLICATIONS

RFC 2396 Uniform Resource Identifiers (URI) : Generic Syntax : 1998.

* cited by examiner

*Primary Examiner*—Gilberto Barron
*Assistant Examiner*—Matthew Heneghan

(57) ABSTRACT

Methods and systems of screening input strings that are intended for use by a Web server are described. In the described embodiment, an attack pattern is determined that can be used to attack a Web server. A search pattern is defined that can be used to detect the attack pattern. The search pattern is defined in a flexible, extensible manner that permits variability among its constituent parts. An input string that is intended for use by a Web server is received and evaluated using the search pattern to ascertain whether the attack pattern is present. If an attack pattern is found that matches the search pattern, then a remedial action is implemented.

14 Claims, 4 Drawing Sheets

METHODS AND SYSTEMS FOR SCREENING INPUT STRINGS INTENDED FOR USE BY WEB SERVERS

RELATED APPLICATIONS

This application is a continuation of and claims priority to U.S. patent application Ser. No. 09/437,584, the disclosure of which is incorporated by reference herein.

BACKGROUND

Web servers are computers that are used to provide access to various resources, e.g. Web pages, for various client devices such as browsers. Typically, an individual uses a client device to provide an input string, such as a URL, to the Web server. The URL indicates to the Web server the location of the particular resource of interest. The Web server then locates the resource using the URL and returns the resource to the client device so that it can be displayed for the individual. Other types of input strings can be provided to the Web server by the client, e.g. input strings in the form of HTTP verb requests (e.g. POST requests) including WebDAV requests.

In the past, malicious individuals have used input strings that are intended for use by Web servers to attack the servers. These individuals will typically try to find an input string that causes the Web server or, perhaps its operating system, to perform in a manner that is inconsistent with simply processing legitimate client requests and returning authorized resources to the client. Input strings that have been used in the past to attack Web servers seem to come in an ever-changing number of varieties and formats. The various attacks that can be waged against a Web server can be categorized as disclosure attacks, integrity attacks, and denial of service attacks.

A disclosure attack takes place when an individual attacks a web site and attempts to read information that they are not authorized to read. For example, there may be some executable code at the server that an individual is not authorized to view. Yet, by providing an input string that causes the server to malfunction, the individual actually gets to view the executable code. Consider, for example, Active Server Pages. Active Server Pages can allow Web developers to use scripting languages like Visual Basic Script and JScript to pass information to various components that contain logic for accessing databases, instruct the components to perform a programmed action, and return the results of the programmed action. The individual is only authorized, and supposed to view the results of the programmed action. Yet, by using particular inappropriate input strings it may be possible for the individual to view the code that produces the results.

An integrity attack is similar to a disclosure attack in that an individual can gain access to unauthorized information. In addition to gaining access to the information, however, integrity attacks involve the manipulation of data or information that is being viewed. This is particularly problematic because the changed, now-invalid information can potentially further compromise an already-compromised Web server.

A denial of service attack is an attack that can cause a decrease in the quality of service or, ultimately, can cause the server to crash. This can adversely impact the server's ability to service other legitimate clients thereby leading to undesirable downtime and customer dissatisfaction.

Many of these types of attacks can be traced directly to the mishandling of an input string that was provided to the Web server. A need exists to deal with problematic input strings in a flexible, quick and convenient manner. Accordingly, this invention arose out of concerns associated with providing improved methods and systems for recognizing problematic input strings and dealing with them before they adversely affect the Web server.

SUMMARY

Methods and systems of screening input strings that are intended for use by a Web server are described. In the described embodiment, an attack pattern is determined that can be used to attack a Web server. A search pattern is defined that can be used to detect the attack pattern. The search pattern is defined in a flexible, extensible manner that permits variability among its constituent parts. An input string that is intended for use by a Web server is received and evaluated using the search pattern to ascertain whether the attack pattern is present. If an attack pattern is found that matches the search pattern, then a remedial action is implemented.

DETAILED DESCRIPTION

Network Configuration

As a preliminary matter, the following disclosure assumes a familiarity with Internet and WWW practices, formats, and protocols. A great number of books are available on these subjects. Stout, Rick, *The World Wide Web: Complete Reference*, McGraw-Hill, 1996, is one example.

Figure 1:
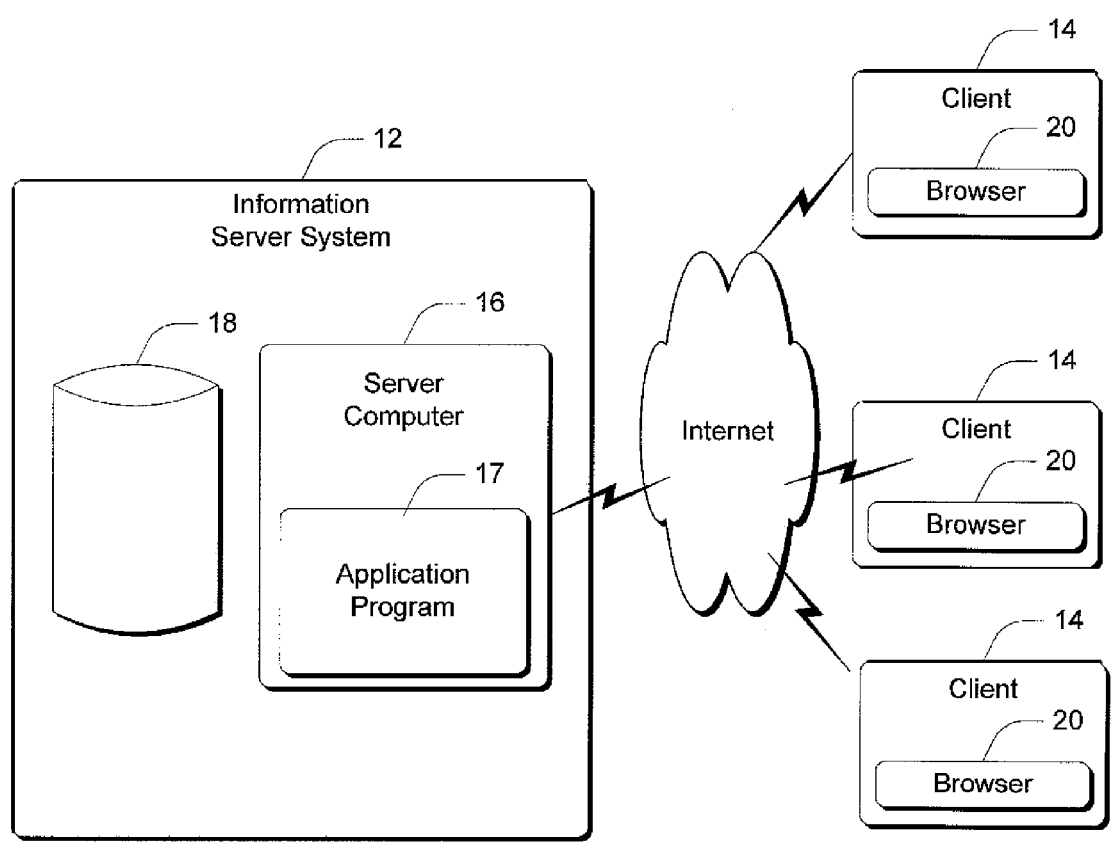
FIG. 1 is a block diagram of a client/server network system having a client and server.

FIG. 1 shows an information server system 12 connected for data communication with associated clients or client devices 14. The information server system comprises a server 16 and a repository 18 of published data and other content. Server 16 is a computer that executes one or more server programs 17. Server 16 has access to repository 18, which is typically a hard disk or other mass storage device. Mass storage device 18 can be located either locally or remotely, and can be connected through a local bus, a local-area network, or a wide-area network such as the Internet. Server 16 includes a data processor, electronic memory, and other components common to computers that are used for server applications.

Each of client devices 14 is any device such as a personal computer that might be connected to receive information from server system 12. Client device 14 has a client viewer or browser 20 that forms an interface to a human user or operator. Client viewer 20 interprets instruction and data streams provided by system 12 and in response presents information to the user in textual, graphical, or other forms.

Client viewer 20 also accepts operator input, and allows the operator to select and navigate from one hypermedia document to another using hyperlinks as described above. Client viewer 20 is connected for data communications with server system 12 by a suitable communications medium such as a local or wide area network, by a modem link, or by a similar continuous or on-demand connection. Data connection can be made between server system 12 and client devices 14 through the Internet, using a standard protocol, such as HTTP (hypertext transport protocol).

An exemplary client viewer 20 is a conventional, off-the-shelf Internet Web browser, having features and functions such as are common to popular Web browsers. Client viewer 20 is not limited to any particular type of Web browser. For instance, client viewer 20 might be the Internet Explorer, available from Microsoft Corporation of Redmond, Wash., or a Netscape Navigator browser, available from Netscape of Mountain View, Calif. Each of these browsers supports a different feature set, and responds to different commands and command sets. In addition, the term "client viewer" as used herein encompasses any software that is used by a client to interpret data obtained from server system 12. In the future, such software will likely comprise a variety of downloadable components and helper applications used by software other than traditional browsers to render multimedia content from the Internet or other servers.

When a user wishes to access a resource that is accessible through the information server system 12, a data stream or input string, e.g. a URL, is prepared by their client viewer 20 and sent to the information server system 12 via an appropriate connective network. The information server system 12 receives the request, processes it, and returns the requested resource to the client 14. The client viewer 20 then enables the user to view the requested resources. Other input strings can be prepared and sent from the client viewer 14 to the information server system 12. An exemplary input string is one that is associated with an HTTP verb request, such as a POST request. Of course, other input strings can be utilized.

Exemplary Computer Architecture

Figure 2:
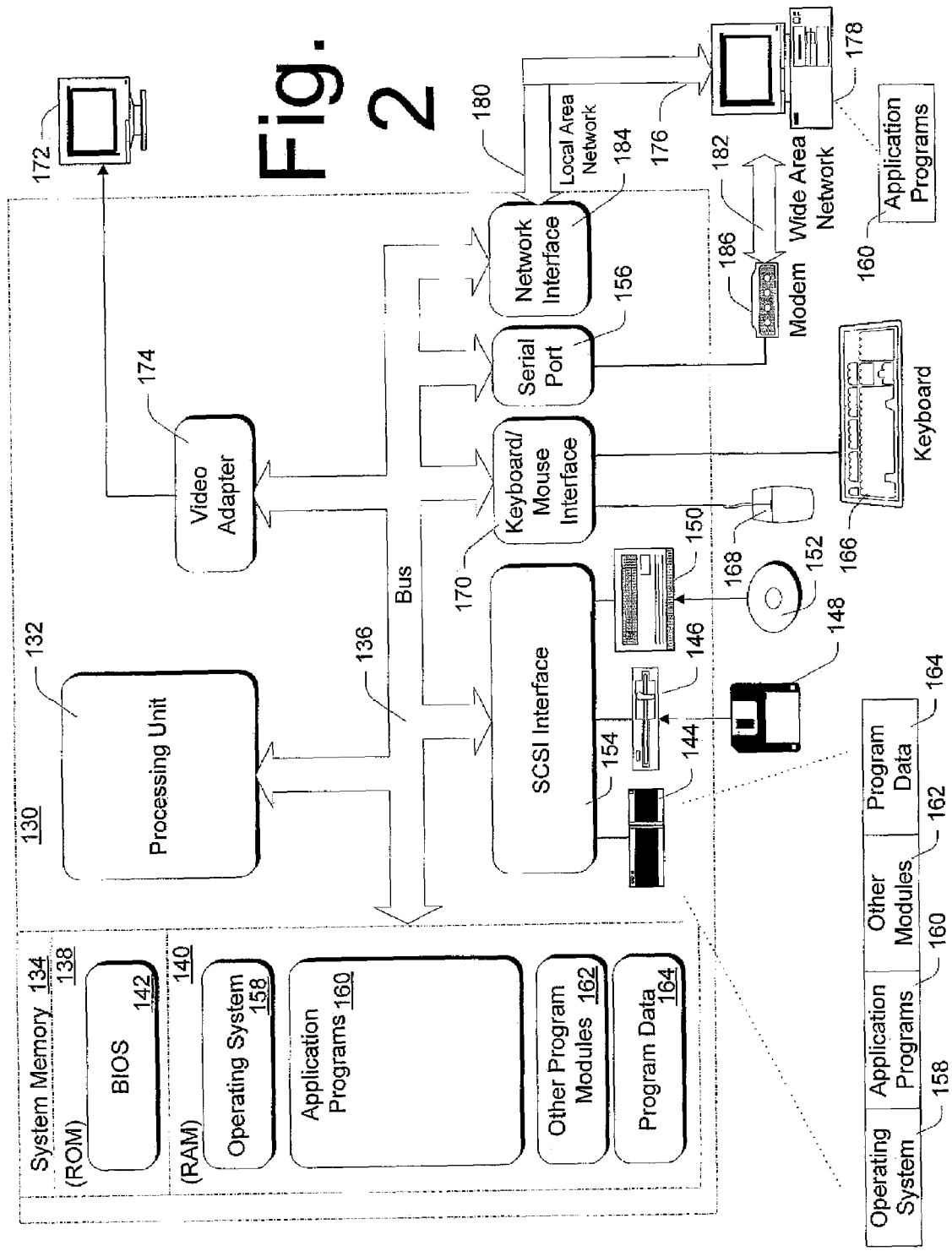
FIG. 2 is a block diagram of an exemplary computer that can be used to implement the client and/or the server of FIG. 1.

FIG. 2 shows a general example of a computer 130 that can be used to implement the client 14 and/or the server 12.

Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158 (e.g., the server operating system 22 below), one or more application programs 160 (e.g., application(s) 30, Internet Information Server 24 below), other program modules 162 (e.g., platform 26 below), and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136 A monitor 172 or is other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 2. The logical connections depicted in FIG. 2 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Input String Screening

Aspects of the invention enable an input string that is provided by a client to be screened before it is processed by the Web server. An "input string" is a URL or other string that is intended for use by the Web server. Screening the input strings ensures that problematic input strings are identified and handled appropriately so that the risk of adversely impacting the Web server is reduced. As an example of a problematic input string consider the following URL input string:

http://www.foo.com/../../../../boot.ini

Assume that data that is associated with www.foo.com is stored in a directory "c:\wwroot\stuff\data". The ".." that appears in the URL input string after the www.foo.com specification can cause the server to move up in the hierarchical directory from "c:\wwroot\stuff\data" by one directory. A series of ".." in the URL input string can cause the server to move up in the hierarchical directory a number of times until it reaches the root directory, in this case the "c:" directory. At this point it might be possible to get access any files in the root directory such as the specified "boot.ini" file. This file might constitute a file that describes how the computer is designed to boot. In this case, a user would be able to view and possibly manipulate an unauthorized file. As another example, consider the following URL input string:

http://www.foo.com/datalookup.asp::$DATA

In this example, it is possible that the server might not understand the "::$DATA" portion of this input string, but that the string portion has a special meaning to the operating system on which the server is executing. As a consequence, the operating system might cause unauthorized files to be accessible to the user.

In both of these examples, the input string can be characterized as containing a pattern that is problematic to the Web server. It is problematic because it can cause the Web server or its operating system to behave in a manner that is inconsistent with returning only authorized resources to a client. In this document, such patterns are referred to as "attack patterns" because they effectively enable an attack on the server. In the above two examples, the attack patterns are constituted by the ".." and "::$" portions of the input string.

In addition to these exemplary attack patterns, there are also input string characteristics that can be indicative of an attack pattern. One such characteristic is if the input string does not contain an alphabetical character at its end. Another characteristic is whether the input string contains any specific "operators" that are inappropriate for an input string. Examples include the operators "!", "<", ">", and "&". Any input string that is found to satisfy the characteristics that are indicative of an attack pattern are likely to be problematic for the server.

Web Server Pattern Matching

Figure 3:
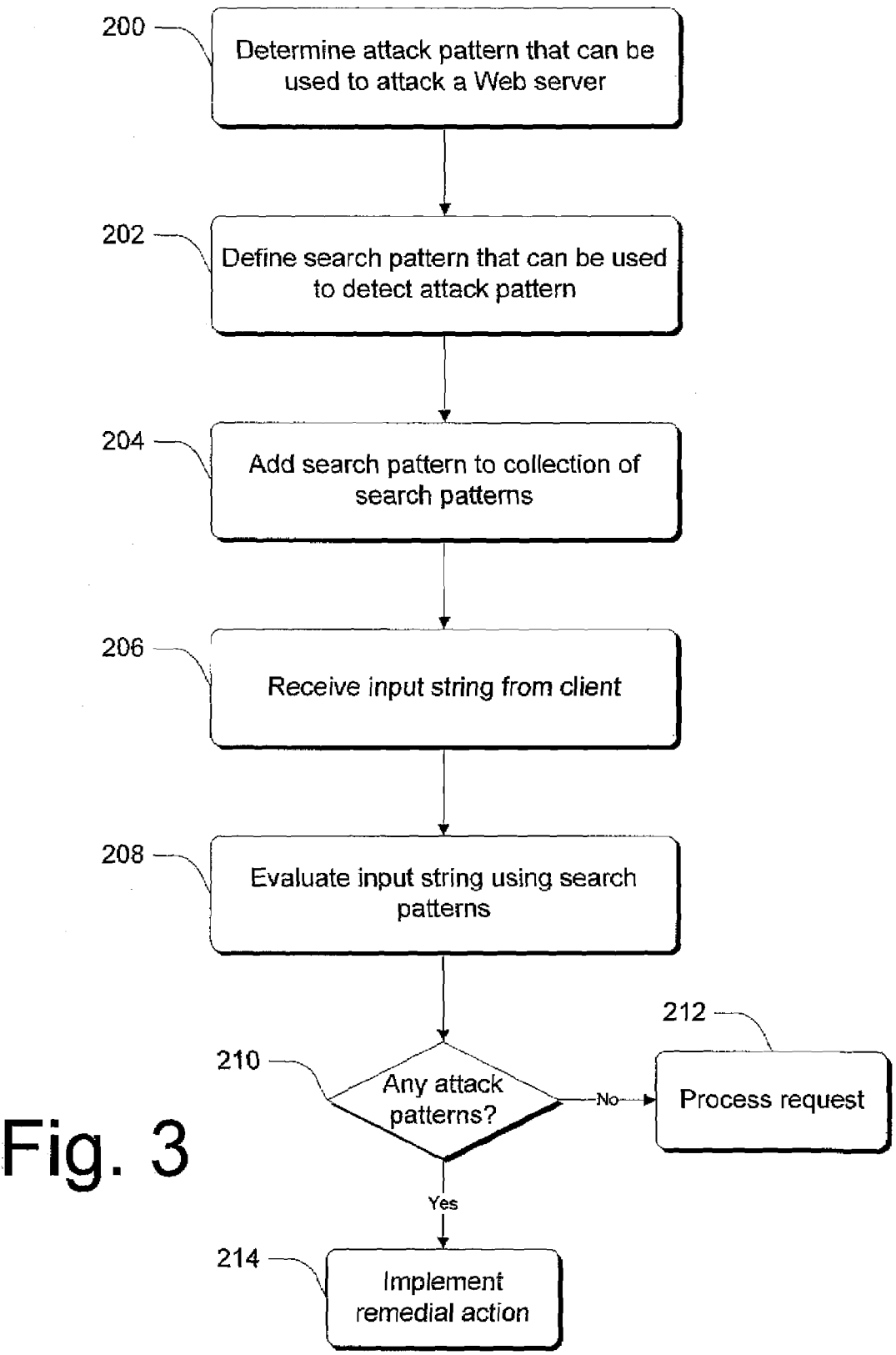
FIG. 3 is a flow diagram that describes steps in a method in accordance with an embodiment of the invention.

FIG. 3 shows a flow diagram that describes steps in an input string screening method for a Web server in accordance with one embodiment of the invention. Step 200 determines an attack pattern that can be used to attack a Web server. One way in which this determination can be made is by simply observing over time, which attacks on a Web server are successful. Another way to determine an attack pattern is to recognize that there are input string characteristics that can be problematic for a Web server. For example, input strings that contain the pattern ".." can be problematic because they might enable an individual to inappropriately "walk" up a directory tree. Additionally, attack patterns can be determined by recognizing that there are certain characters that are simply not appropriate for inclusion in an input string. Examples of certain operators were given above.

With one or more attack patterns having been determined, step 202 defines a search pattern that can be used to detect the attack pattern. A search pattern is an expression that is compared with input strings to determine whether there is a matching search pattern in the input string. In the described embodiment, a search pattern can be formatted syntactically in a manner that allows specification of both identity and variability among constituent parts of an input string. Thus, the search pattern can include literal parts that call for an exact character-by-character match between those parts and corresponding parts of the input string, and variable parts that allow for inexact matches or no match at all between those parts and corresponding parts of the input string. An input string is said to "match" a search pattern if the search pattern is found anywhere within the input string as specified by the search pattern. In the described embodiment, one or more search patterns are specified as regular expressions. In a regular expression, each character matches itself, unless it is one of a number of special characters that indicate variable characters in the input string. An example subset of regular expression definitions and their meanings is given below:

| Pattern | Meaning |
| --- | --- |
| . | Matches an arbitrary character |
| (...) | Groups a series of pattern elements to a single element |
| ^ | Matches the beginning of the target |
| + | Matches the preceding pattern elements one or more times. For example, ba+c matches bac, baac, but not be. |
| $ | Matches the end of the line. For example, 100$ matches 100 at the end of a line. |
| [...] | Denotes a class of characters to match; [^...] negates the class. For example, b[aeiou]d matches bad, bed, bid, bod, and bud (but not bead or beed); and r[eo]+d matches red, rod, reed, rood, reod, roed, reood, roeod, etc. |
| [^] | Matches any character except those following the caret (^) character in the brackets, or any of an ASCII range of characters separated by a hyphen (-). For example, x[^0-9] matches xa, xb, xc, and so on, but not x0, x1, x2, and so on. |
| (...\|...) | Matches one of the alternatives |
| ? | Matches the preceding character zero or one time. |
| * | Matches the preceding character zero or more times. For example, ba*c matches be, bac, baac, and so on. |
| {} | Matches any sequence of characters between the escaped braces. For example, {ju}+fruit matches jufruit, jujufruit, but not ufruit, jfruit, or ujfruit. |
| \ | Removes the pattern match characteristics from the special characters listed above. For example, 100$ matches 100 at the end of a line, but 100\$ matches the character string 100$ anywhere on a line. |

By defining search patterns as described above, flexibility and extensibility are enhanced by enabling a system administrator to define a search pattern in terms of a generalized regular pattern that reflects an attack pattern of which the system administrator has recently become aware. The definition of search patterns in this manner is timely because the search patterns can be defined almost as soon as the attack patterns are detected, without the need to hardcode specific patterns.

In the described embodiment, patterns can be collected into collections of patterns as more and more patterns are observed or determined. Accordingly, step 204 adds the pattern defined in step 202 to such a collection. The collection of patterns can be stored and maintained in memory. In the described embodiment, the collection is adapted for addition to, deletion of, or modification of the patterns that it contains. This facilitates the overall extensibility of the collection of patterns. In the described embodiment, steps 200–204 can be implemented using an administrative tool or some other suitable interface.

Step 206 receives an input string from the client that is intended for use by the Web server, and step 208 evaluates the input string using one or more of the search patterns. Step 210 determines whether any of the attack patterns are present in the input string. An attack pattern is present if a match is found for the search pattern in the input string. If there are no attack patterns present in the input string, then step 212 processes the input string or request that is associated with the input string. Where an input string comprises a URL, processing can include retrieving an appropriate resource, i.e. a Web page, and returning it to the client. If, on the other hand, there is an attack pattern that is identified to be associated with the input string (i.e. an attack pattern is found in the input string that matches the search pattern), then step 214 implements a remedial action. Remedial actions can be any actions that are associated with minimizing or eliminating the effect that an attack pattern can have on the Web server. In but one example, this can include denying a request that is associated with the input string. For example, in the case of an input string that is a URL, this could mean returning an error message to the client to the effect that the request could not be executed.

Input String Screening Tool

Figure 4:
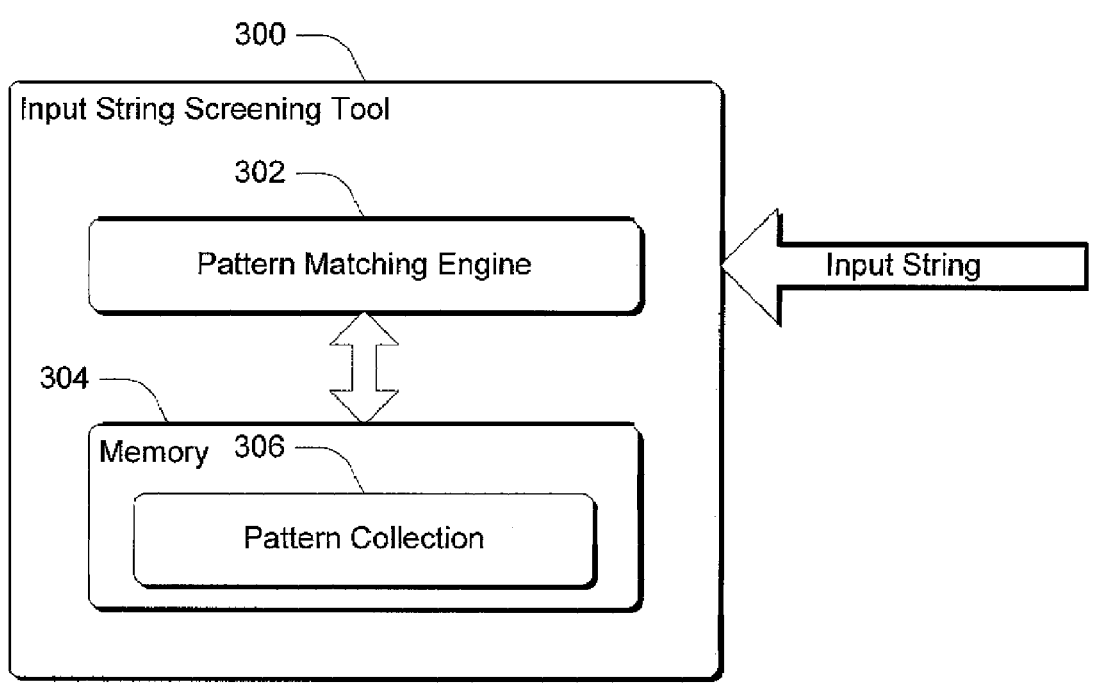
FIG. 4 is a block diagram of an input string screening tool in accordance with an embodiment of the invention.

FIG. 4 shows an embodiment of an input string screening tool 300. The illustrated input string screening tool 300 can be implemented in any suitable software, hardware or firmware. In addition, the tool 300 can comprise an integral part of a Web server, e.g. part of the Web server's parsing engine/function, or can be implemented as an extension to an existing Web server. As an example, the tool 300 can be implemented as an Internet Service Application Programming Interface (ISAPI) extension that is suitable for use with Microsoft's Internet Information Service (IIS) product. In this case, the ISAPI extension can register with IIS to receive input strings when they are sent from a client. The ISAPI extension then evaluates the input strings and determines whether any of the defined attack patterns are present. If any attack patterns are determined to be present, then the ISAPI extension can take any remedial action that is appropriate in order to eliminate the risk to IIS.

In the FIG. 4 embodiment, input string screening tool 300 includes a pattern matching engine 302 and a memory location 304. Memory location 304 contains one or more patterns that have been defined and make up a pattern collection 306. The patterns are stored in the memory location and are accessible to the screening tool for evaluating input strings. The pattern matching engine can retrieve one or more search patterns and use them to evaluate an input string to determine whether it likely constitutes an attack on the Web server.

Advantages of the described embodiment include the ability to flexibly define a plurality of extensible patterns that can be used to screen input strings for attack patterns that can adversely affect performance of a Web server. System administrators are given the opportunity to quickly take action by being able to quickly define generalized regular patterns on the fly. This, in turn, increases the response time so that any effects on a Web server that are associated with an attack are mitigated to the extent possible.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computing device for screening input strings comprising:
   one or more processors;
   one or more computer-readable media;
   computer-readable instructions on the one or more computer-readable media which, when executed by the one or more processors, cause the one or more processors to implement a method comprising:
      determining an attack pattern that can be used to attack a Web server, the attack pattern comprising content that is determined as constituting one or more of a disclosure attack or an integrity attack on the Web server;
      defining a search pattern that can be used to detect the attack pattern, the search pattern being defined in a manner that permits variability among its constituent parts;
      receiving an input string that is intended for use by a Web server;
   evaluating the input string using the search pattern to ascertain whether the attack pattern is present; and
   implementing a remedial action if an attack pattern is found that matches the search pattern.

2. The computing device of claim 1, wherein:
   said defining comprises defining a plurality of different search patterns; and
   said evaluating comprises evaluating the input string using said plurality of different search patterns.

3. The computing device of claim 1, wherein the search pattern is specified as a regular expression.

4. The computing device of claim 1, wherein said receiving of the input string comprises receiving a URL.

5. The computing device of claim 1, wherein said receiving of the input string comprises receiving a portion of an HTTP verb request.

6. The computing device of claim 1, wherein said implementing comprises denying a request that is associated with the input string.

7. A system for enabling a Web server to screen input strings comprising:
   means for defining one or more search patterns that are specified as a regular expression, the search patterns being usable to search for an attack pattern that can be used to attack the Web server, the attack pattern comprising content that is determined as constituting one or more of a disclosure attack or an integrity attack on the Web server; and
   means for storing the one or more search patterns in a memory location that is accessible to a screening tool for evaluating an input string that is intended for receipt by the Web server.

8. The system of claim 7 further comprising:
means for retrieving a search pattern from the memory location; and
means for evaluating an input string with the screening tool by ascertaining whether the input string includes at least a portion that matches the search pattern.

9. The system of claim 8, wherein the means for evaluating the input string comprises means for evaluating a URL.

10. The system of claim 8, wherein the means for evaluating the input string comprises means for evaluating a portion of an HTTP verb request.

11. A computing device comprising:
one or more processors;
one or more computer readable media;
computer-readable instructions on the one or more computer-readable media which, when executed perform a method comprising:
receiving an input string that is intended for use by a Web server;
evaluating the input string using a search pattern to ascertain whether the input string contains an attack pattern that can be used to attack the Web server, the attack pattern comprising content that is determined as constituting one or more of a disclosure attack or an integrity attack on the Web server, the search pattern comprising literal characters and special characters, wherein literal characters indicate exact characters in the input string, and the special characters indicate variable characters in the input string; and
implementing a remedial action if an attack pattern is found that matches the search pattern.

12. The computing device of claim 11, wherein said implementing comprises denying a request that is associated with the input string.

13. The computer computing device of claim 11, wherein said receiving comprises receiving a URL.

14. The computing device of claim 11, wherein said receiving comprises receiving an input string that is associated with an HTTP verb request.

* * * * *